(12) United States Patent
Shmunis

(10) Patent No.: US 6,300,943 B1
(45) Date of Patent: Oct. 9, 2001

(54) METHOD AND DEVICE FOR INPUT OF ALPHANUMERIC DATA INTO A MACHINE BY A MAN

(76) Inventor: Gregory Shmunis, 649 Dartmouth Ave., San Carlos, CA (US) 94070

( * ) Notice: Subject to any disclaimer, the term of this patent is extended or adjusted under 35 U.S.C. 154(b) by 267 days.

(21) Appl. No.: 09/009,783

(22) Filed: Jan. 20, 1998

(51) Int. Cl.[7] .............................. G08C 21/00; G09G 5/00
(52) U.S. Cl. ........................ 345/173; 345/179; 345/175; 178/18.01; 178/18.03
(58) Field of Search ........................... 345/173, 175, 345/179, 180; 178/18.01, 18.03, 18.09, 19.01, 19.03, 19.04; 382/119, 181, 187

(56) References Cited

U.S. PATENT DOCUMENTS

| | | | |
|---|---|---|---|
| 4,975,546 | * 12/1990 | Craig | 178/19 |
| 5,477,012 | * 12/1995 | Sekendur | 178/18 |
| 5,525,764 | * 6/1996 | Junkins et al. | 178/18 |
| 5,706,026 | * 1/1998 | Kent et al. | 345/156 |
| 5,861,876 | * 6/1999 | Nakayama | 345/179 |

\* cited by examiner

Primary Examiner—Vijay Shankar
Assistant Examiner—Mansour M. Said

(57) ABSTRACT

A method and device for input of alphanumeric data into a machine by a man in a manner of hand writing with no need for softwear-based means for alphabetical characters recognition, which purpose is achieved by defining each alphabetical character as a specific collection of signals, which are produced by actuation of a group of sensors by a hand held stylus, moved by a man along predetermined traceable paths, within which paths said sensors are located in such a manner, that for each alphabetical character location of corresponding sensors form a pattern similar to usual hand written image of that character.

1 Claim, 6 Drawing Sheets

FIG. 5

| DATA CHARACTER | SENSOR 1 | 2 | 3 | 4 | 5 | 6 | 7 | 8 | 9 | 0 | # | * | SWITCH SPACE MARK | CONTACT DETECTOR |
|---|---|---|---|---|---|---|---|---|---|---|---|---|---|---|
| 1 | • | | | | | | | | | | | | | |
| 2 | | • | | | | | | | | | | | | |
| 3 | | | • | | | | | | | | | | | |
| 4 | | | | • | | | | | | | | | | |
| 5 | | | | | • | | | | | | | | | |
| 6 | | | | | | • | | | | | | | | |
| 7 | | | | | | | • | | | | | | | |
| 8 | | | | | | | | • | | | | | | |
| 9 | | | | | | | | | • | | | | | |
| 0 | | | | | | | | | | • | | | | |
| # | | | | | | | | | | | • | | | |
| * | | | | | | | | | | | | • | | |
| A | | | | • | | • | • | • | | • | • | • | | |
| B | • | • | | • | • | | • | • | | | • | • | | |
| C | • | • | • | • | | | • | • | | | | | | |
| D | • | • | | • | | • | • | • | | • | • | • | | |
| E | • | • | • | • | • | • | • | | | | | | | |
| F | • | • | • | • | • | • | | | | | | | | |
| G | • | • | | • | • | • | • | • | | • | | | | |
| H | • | | • | • | • | • | • | | • | • | | | | |
| I | | • | | • | | | • | | | | | | | |
| J | | • | | | • | • | • | | | | | | | |
| K | • | | • | • | | • | | • | | • | • | | | |
| L | • | | • | | | • | • | • | | | | | | |
| M | • | • | • | • | • | • | • | | • | | | | | |
| N | • | • | • | • | • | • | • | | | • | | | | |
| O | • | • | • | • | | • | • | • | | | | | | |
| P | • | • | • | • | • | • | | | • | | | | | |
| Q | • | • | • | • | • | • | • | | | • | | | | |
| R | • | • | • | • | • | • | • | | • | • | | | | |
| S | • | • | • | • | • | | • | • | | | | | | |
| T | • | • | • | | | | • | | | | | | | |
| U | • | | • | • | | • | • | • | | | | | | |
| V | • | • | • | • | | • | | | • | | | | | |
| W | • | | • | • | • | • | | • | | • | | | | |
| X | • | | • | • | | | • | | | • | • | | | |
| Y | • | | • | • | | | • | | | • | | | | |
| Z | • | • | • | | • | • | • | • | | • | | | | |
| SPACE MARK MOD. I | | | | | | | | | | • | • | • | | |
| SPACE MARK MOD. II | | | | | | | | | | | | | • | |
| SPACE MARK MOD. III | | | | | | | | | | | | | | • |

METHOD AND DEVICE FOR INPUT OF ALPHANUMERIC DATA INTO A MACHINE BY A MAN

In this disclosure a man means any human being regardless of sex or age. Present invention belongs to data input devices which are a subdivision of interface devices which are means for two-way flow of information in a man to a machine communication. The data input devices deliver the information from a man to a machine, whereas the data output devices deliver the information from a machine to a man.

Alphanumeric data consist of following data characters: alphabethical characters (letters), numeric characters (numerals), special symbols (like star *, pound # and other similar symbols for performing of some specific function) and one or several space marks, specifically assigned for separating of other symbols. There are many known configurations of input devices: control panels, push buttons pads, keyboards, etc. The problem with them is that they contain big number of switches, assigned to various functions, which often are confusing and different for various machines in same environment and difficult for a man to remember. To some extent this problem is addressed by input devices with alphanumeric characters, hand written by a man and recognizable by a machine. Application of these devices is limited because they need means to run a computer program for characters recognition.

A purpose of present invention is to propose a method and device for input of alphanumeric data into a machine by a man in a manner of hand writing with no need for softwear-based means for alphabetical characters recognition. This is achieved according to present invention by defining each character as a specific collection of signals which are produced by actuation of group of sensors by a hand held stylus, moved by a man in a hand-writing manner along predetermined traceable paths and which (signals) are recognizable by electrical hardware circuitries without any computer softwear.

The method and device according to present invention can be used in almost any piece of equipment in a modem household environment: telephone, TV set, VCR, microwave oven, washing machine, etc. And in some computing equipment too. The input device according to present invention is shown on FIGS. 1, 2, 3, 4, 5 and 6.

FIG. 5 shows correlations between data characters and corresponding sensors and switches.

Figure 1:
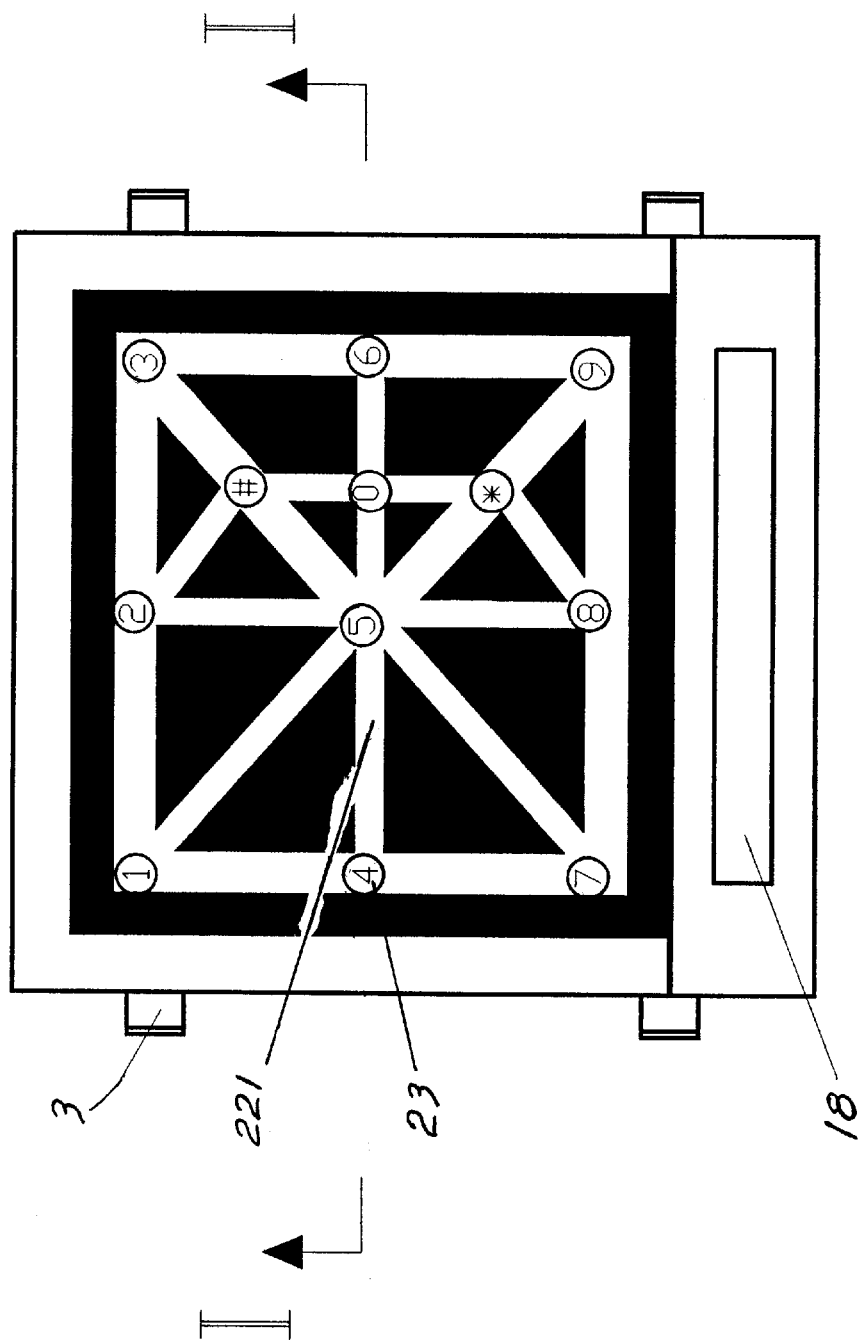
FIG. 1 shows its plan view.

The input device according to present invention (see FIG. 1 and FIG. 2) comprises housing assembly 1 and cover assembly 2, which are mechanically connected by easily deformable links 3 and electrically connected by wires 4, and a stylus 5.

Housing assembly 1 contains housing 11 with power supply 12, illuminatror 13, electrical circuitries 14, switch 15, a power cable 16 and a data cable 17. Power cable 16 connects the device to a power line. Data cable 17 connects the device to a machine, into which the data input goes. Power supply 12 converts commercial AC energy into specific form corresponding to a particular type of utilized sensors. Illuminator 13 lights up the cover assembly 2 from underneath.

Switch 15 detects presence of a mechanical contact between stylus 5 and cover assembly 2 and signalizes said contact's disruption, which signal can be used to automatically enter a space mark between characters in one of several available modes of operation. Switch 15 is actuated by small vertical displacement of cover assembly 2 due to deformation of easily deformable links 3 under contact pressure of stylus 5 toward cover assembly 2. When said contact is disrupted, links 3 spring back, cover assembly 2 moves up and switch 15 signalizes that situation.

Cover assembly 2 comprises a plate 21 with top side 211 and bottom side 212, a stencil-like mask 22, which is a layer of optically non-transparent material with a pattern of optically transparent traceable paths 221, and plurality of sensors 23 attached to side 212 in predetermined spots within traceable paths 221. The mask 22 is attached to side 212 by mechanical means or by adhesive bonding or formed by film technology. Sensors 23 are attached to side 212 by mechanical means or by adhesive bonding. Each sensor 23 is equipped with individual signal generating circuitry 231 which, when said sensor is actuated by stylus 5, produces a signal containing one or several electrical pulses of specific form. The form or number of] said pulses define unique electrical signature of each individual sensor 23, so that, when electrical circuitries 14 receive a signal, it is known from which sensor it came.

Each numeric character's input and each special symbol's input is defined as a signature of a single corresponding sensor, assigned for that character entering. Each alphabethical character's input is defined as a collection of signatures of a specific group of corresponding sensors. It does not matter in which order said signatures are collected. If for some reason same signature came to same collection more than one time, it will be considered only once.

Adjacent collections are separated by appropriate space mark. Adjacent characters in the same word are separated by a single-space mark. Adjacent words are separated by a double-space mark. A double-space mark can be entered by entering twice a single-space mark, or by entering a specific combination of special symbols and numeric characters. This combination is in principle reduceable to a single data character, assigned to this function exclusively.

According to present invention, a space mark is entered by different means in several optional modes of operation.

In first mode of operation (mod.I) space mark is entered by actuation by stylus 5 a specific predetermined combination of special symbols and numeric characters, for example #0* . This combination, reduceable to a single data character, can be assigned to entering of either a single-space mark or a double-space mark. Mod.I is the most simple, but is not the fastest mode of operation.

In second mode of operation Mod.II) a single-space mark is entered, like a special symbol, by manual actuation of specially provided switch, specifically assigned to this function only. This switch can be located either on a housing 11 or on a stylus 5. If located on a housing, it is formed as a space bar 18, like a space bar of a standard keyboard, and is actuated by man's left hand if the stylus is held in right one, or it is actuated by man's right hand if the stylus is held in left one, as left-handed people do. Or it can be pressed by a stylus 5. If said switch is located on a stylus, it is formed as a push button 58, actuated by a thumb or by a forefinger. Mod.II, if man's both hands are employed, may be somewhat faster than mod.I.

In third mode of operation (mod.III) a single-space mark is entered automatically by actuation of pressure-sensitive detector of a mechanical contact between stylus 5 and cover assembly 2, which detector signalizes said contact's disruption. Said pressure-sensitive detector of stylus-to-plate contact can be located either in a housing 11 (in which case this detector is a switch 15, described above) or in a stylus 5 (in which case this is a built-in switch 53, described below). Mod.III requires that a desired collection of signatures must be "picked" without breaking a contact between stylus 5 and plate 21 and defines an alphabethical character as a group of signatures collected uninterruptedly, i.e. between two disruptions. To enter an alphabethical character in mod.III, a man must move stylus 5 along top side 211 of plate 21, keeping some contact pressure between them and strictly avoiding any motion of the stylus up. Disruption of said contact pressure produces a separation between adjacent characters. Some people may find mod.III very attractive, but some others may not.

Selection of most suitable mode of operation or a combination of them is a matter of a particular application and of individual man's preferences. One of practically attractive combinations is to assign mod.III for a single-space mark entering and to assign mod. for double-space mark entering.

Figure 2:
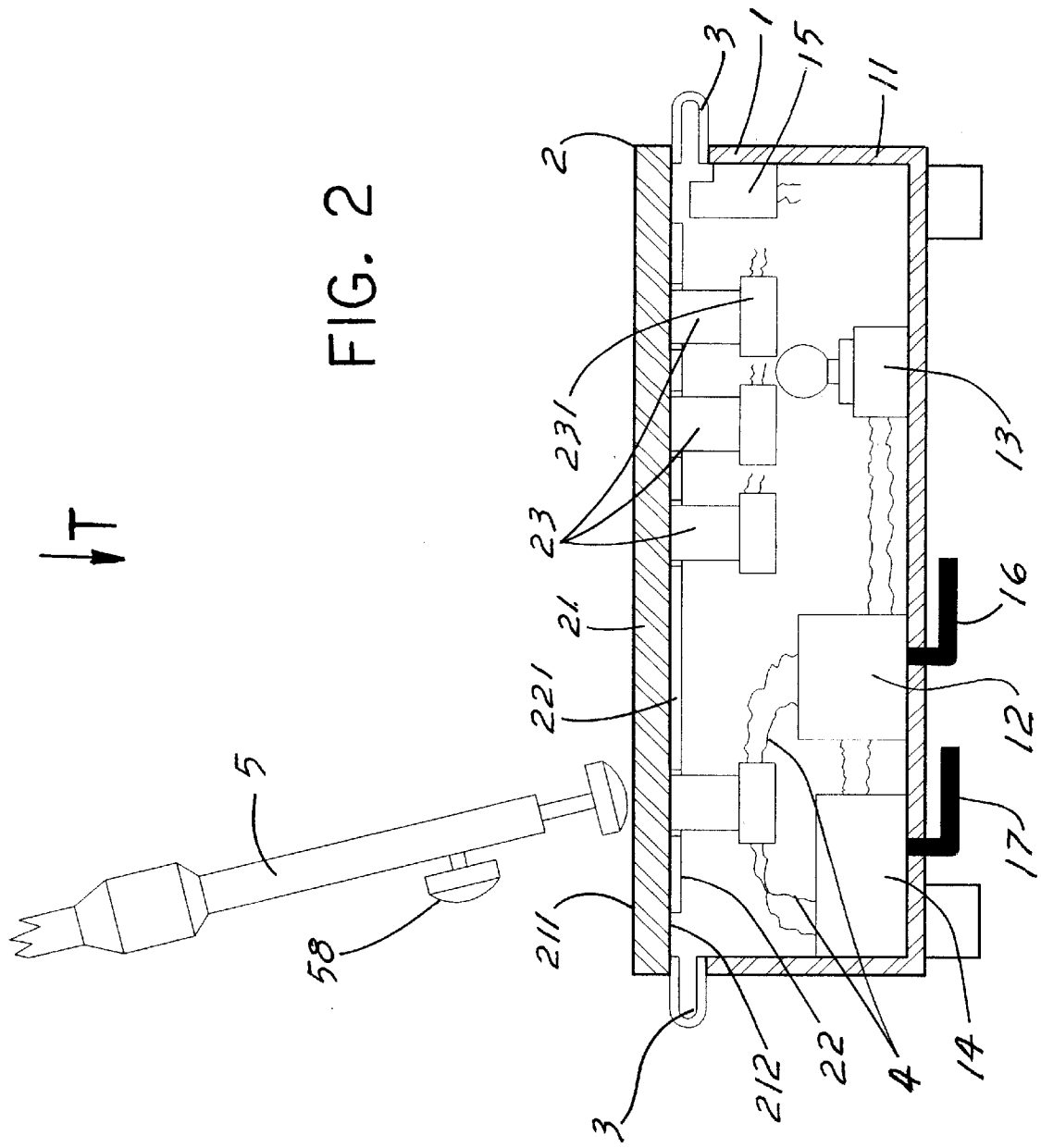
FIG. 2 shows its elevation cross section.
Figure 3:
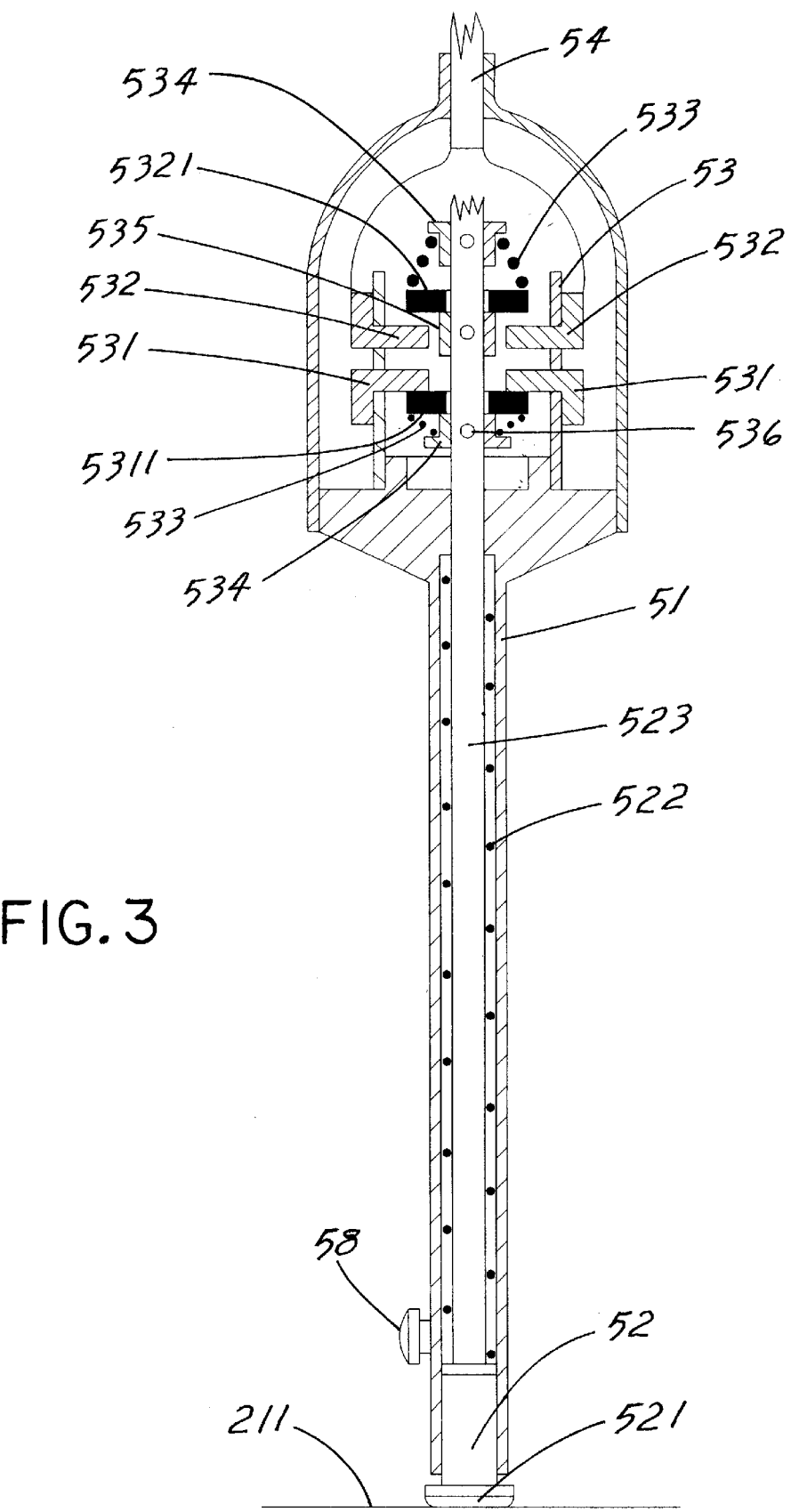
FIG. 3 shows a longitudinal crossection of stylus with a pencil-like handle and built-in pressure-sensitive switch in a point of time immediately prior to space mark entering.
Figure 4:
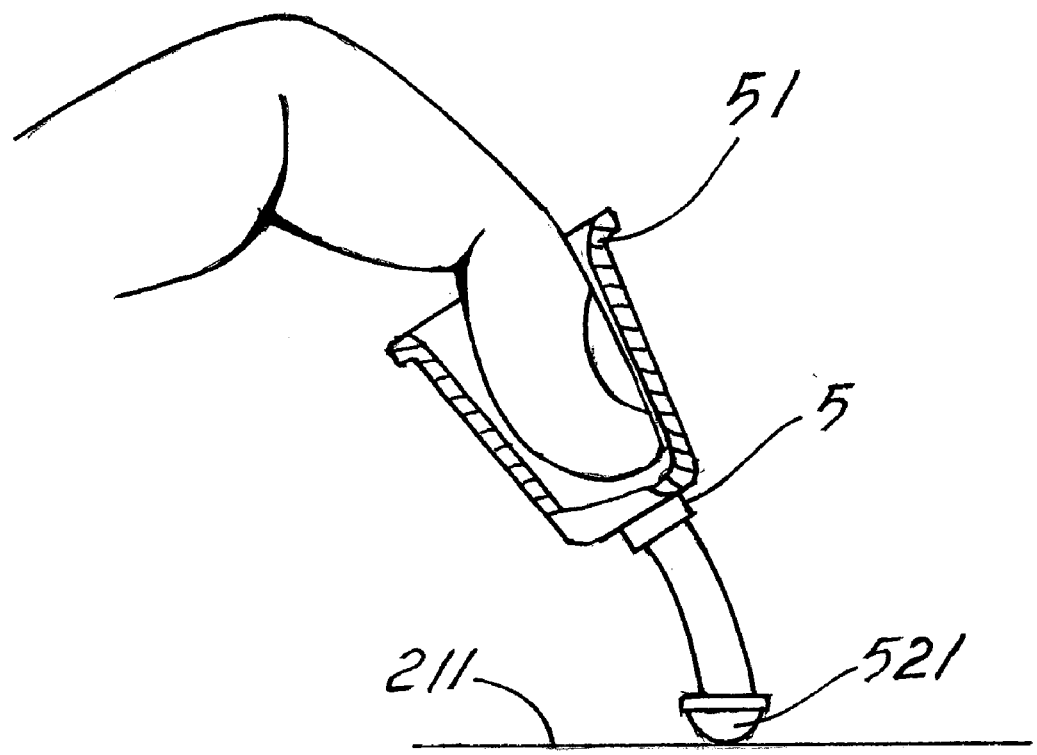
FIG. 4 shows a configuration of stylus with a thimble-like handle.

Stylus 5 (see FIG. 2 and FIG. 3) is a hand-held tool, manually brought into contact with top surface 211 of plate 21 above location of a selected sensor 23 in order to actuate said sensor to produce a corresponding signature. Stylus 5 comprises a handle 51, by which a man holds it, a tip assembly 52 with a tip 521, which is manually brought into contact or out of contact with surface 211 in a point above said sensor 23, and a built-in pressure-sensitive switch 53. Handle 51 may have a pencil-like shape, shown on FIG. 3, to be held by a man in a manner a regular pencil is held, or a thimble-like shape, shown on FIG. 4, to fit over forefinger. Switch 53 (see FIG. 3) has two pairs of electrical contacts arranged in such a manner that, immediately prior to space mark entering, when tip 521 is pressed against surface 211, contacts of first pair 531 are connected to each other by electrically conductive washer 5311 whereas contacts of second pair 532 are disconnected from each other. A space mark is entered automatically in mod.III, when a man disrupts a mechanical contact between tip 521 and surface 211 by moving stylus 5 up, thus enabling spring 522 to move rod 523 down with respect to handle 51. In the process of this relative motion contacts of second pair 532 are becoming connected to each other by electrically conductive washer 5321 and after it happened the contacts of first pair 531 are becoming disconnected from each other. Springs 533 are several times weaker than spring 522. Bushings 534 and collar 535 are attached to rod 523 by fasteners 536. Change of state of contacts 531 and 532 produces space mark entering via appropriate electrical circuitry.

Electrical contacts of switch 15, of space bar 18 and of of push button 58 work in principle in same sequence as contacts in switch 53. Present invention is concerned with this sequence rather than with the particular mechanical arrangements of said electrical contacts.

Shape and material of tip 521 correspond to a particular type of utilized sensors 23.

If sensors 23 are optical sensors with decoupled light emitter and light receiver, tip 521 is optical coupler, like a mirror or a prism.

If sensors 23 are of magnetic type, tip 521 is a permanent magnet or electromagnet.

If sensors 23 are inductive proximity sensors, tip 521 is of ferromagnetic material.

If sensors 23 are common type capacitive proximity sensors, tip 521 is electrically conductive.

If sensors 23 are photodetectors, tip 521 is a ligth emitter, for examle, a laser diode.

In some of above configurations stylus 5 is electrically connected to a housing assembly 1 by a flexible cable 54. In some other configurations stylus 5 is free of any connection with housing assembly 1, as for example shown on FIG. 4.

In all cases tip 521 is separated from sensors 23 by a plate 21 and interacts with them in a non-contact manner through plate 21, which plate must be sufficiently transparent for such interaction in order not to impede it. For this reason, a preferable material for plate 21 is glass: it is mechanically hard, optically transparent, non-magnetic and electrically non-conductive.

As shown on FIG. 1, stencil-like mask 22 has a form of a rectangle, and its sides, its center lines and its diagonals determine directions of traceable paths 221. Sensors 23 are located within traceable paths 221 in a following order: four sensors at said rectangle vertices, four sensors at midpoints of said rectangle sides, one sensor at said rectangle center and three sensors at midpoints between the center and the sensors, located at said rectangle right side. Total number of sensors in above configuration is twelve and, like in a standard telephone key-pad, ten of them are assigned for input of numeric characters and two of them are assigned for input of special symbols.

Figure 6:
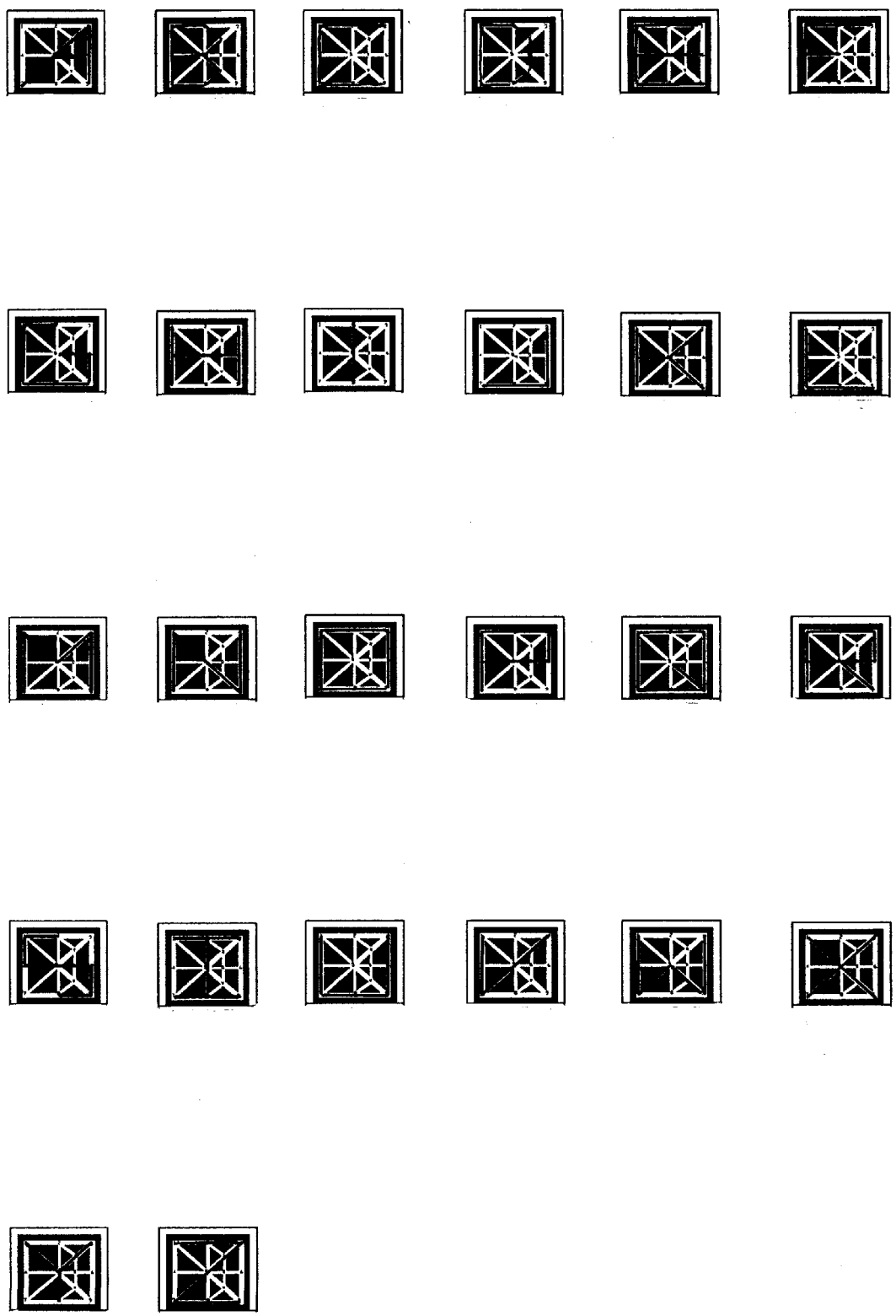
FIG. 6 shows for each alphabethical character a similarity of corresponding sensors locations pattern to a hand written picture of that character.

According to present invention a relative location and assignment of sensors 23 is such that a group of sensors, corresponding to input of each alphabethical character, as shown on FIG. 5, forms a pattern similar to usual hand written image of that character, as shown on FIG. 6. It simply means, that to enter a letter, a man has to a "write" that letter by sliding the stylus' tip 521 along corresponding traceable paths 221. FIG. 6 shows which paths correspond to each letter and how close is the similarity of these paths paterns to usual hand written image of that letter.

The data characters, entered as described above, form data input into a machine, which has a controller, converting the data into operating commands for the machine's working organs.

I claim:

1. A device for input of alphanumeric data into a machine by a man, which device employs plurality of electrically connected switches, each switch producing a unique electronic signature when actuated by a hand-held actuator, said switches are located within predetermined paths of a stencil, said paths clearly visible by human eye and traceable by human hand, there is a predetermined single switch for entering of each numeric data character, there is a predetermined group of several switches for entering of each alphabetical data character, location of the switches in said group forms a pattern similar to usual hand-written image of said alphabetical data character, and said stencil is a two-dimensional array of plurality of rectangles, the sides of said rectangles and the lines that joint the midpoints of opposite sides of said rectangles and the diagonals of said rectangles form a set of lines, and said paths form a subset of said set.

* * * * *